United States Patent [19]

Müller

[11] Patent Number: 5,153,536
[45] Date of Patent: Oct. 6, 1992

[54] SUPPRESSED CARRIER MODULATOR FORMED FROM TWO PARTIAL MODULATORS EACH INCLUDING A PHASE DELAY PATH

[75] Inventor: Fred-Egon Müller, Pforzheim, Fed. Rep. of Germany

[73] Assignee: Alcatel N. V., Amsterdam, Netherlands

[21] Appl. No.: 627,632

[22] Filed: Dec. 14, 1990

[30] Foreign Application Priority Data

Dec. 14, 1989 [DE] Fed. Rep. of Germany ....... 3941281
Sep. 7, 1990 [DE] Fed. Rep. of Germany ....... 4028370

[51] Int. Cl.⁵ .................... H03C 1/14; H03C 1/58; H04L 27/20
[52] U.S. Cl. ..................... 332/105; 332/152; 332/164; 332/168; 332/172; 332/177; 375/39; 375/43; 375/61; 455/46; 455/109; 455/327; 455/330; 455/332
[58] Field of Search ............ 332/103–105, 332/151, 152, 167–169, 172, 177, 178, 163, 164; 455/46, 109, 327, 326, 330, 332; 375/39, 43, 61

[56] References Cited

U.S. PATENT DOCUMENTS 4,249,263 2/1981 Shinkawa et al. ............ 455/327
4,509,208 4/1985 Sogo et al. ................... 455/332

FOREIGN PATENT DOCUMENTS 2944642 4/1985 Fed. Rep. of Germany .

*Primary Examiner*—Siegfried H. Grimm
*Attorney, Agent, or Firm*—Brunell & May

[57] ABSTRACT

A modulator suitable for 16 quadrature amplitude modulation (QAM) is designed as a double modulator (1), wherein a 16 QAM modulator (39) consists of two double modulators (1). One double modulator (1) has two partial modulators (1′,1″) forming a bridge. Each partial modulator (1′,1″) has two possible transmission paths: (6′,6″) with a phase delay line (39′,39″) which causes a 180° phase shift. On each of the two paths (6′,6″, 7′,7″), a semiconductor diode ($D_1'$,$D_1''$,$D_2'$,$D_2''$) is disposed in such a way that they provide the carrier ($U_c$) with a 180° phase inversion and are accordingly rendered conductive in unison, if no modulation voltage ($U_m$) is applied, whereby the carrier is suppressed at the signal output (3′). When a modulation signal ($U_m$) is applied, the balance is changed to push-pull, and one of the two paths (6′,6″) assumes less impedance compared to the other path (7′,7″), which leads to the generation of the modulated carrier voltage ($U_{mc}$). Through its design as a double modulator (1) such that the transmission path is realized respectively via an electrically short path (7′,7″) of one partial modulator (1′,1″) and via a phase delay path (6″,6′) of the other partial modulator (1′,1″) or conversely, differences in the two paths are averaged. The double push-pull modulator (1) is used in radio link systems. The modulator (1) can also be used as a mixer.

11 Claims, 3 Drawing Sheets

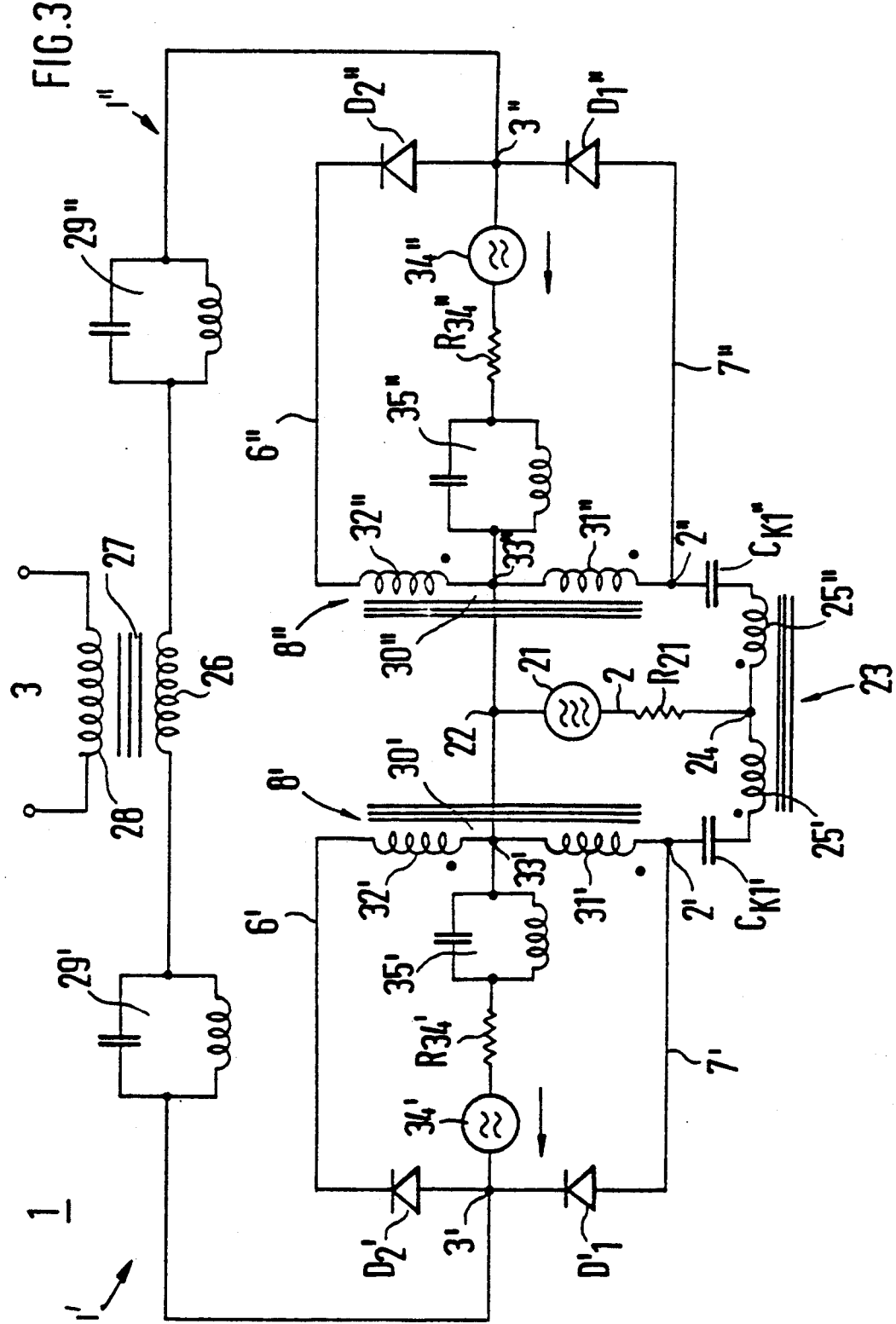

SUPPRESSED CARRIER MODULATOR FORMED FROM TWO PARTIAL MODULATORS EACH INCLUDING A PHASE DELAY PATH

DESCRIPTION

TECHNICAL FIELD

The invention relates to a modulator formed from two partial modulators each having a phase delay path and its use as a mixer.

CLAIM FOR PRIORITY

This application is based on and claims priority from related German Patent Applications No. 40 28 370.4 dated 7 Sep. 1990 and No. 39 41 281.4 dated 14 Dec. 1989. To the extent such prior applications may contain any additional information that might be of any assistance in the use and understanding of the invention claimed herein, they are hereby incorporated by reference.

BACKGROUND ART

For transmission of digital messages, signals are modulated by means of a modulator onto a carrier. A known transmission scheme uses a direct modulator in which a carrier and a signal input and a signal output are coupled as follows. The carrier input and the signal output are coupled to each other via two paths with a phase delay line disposed on one of the paths. Furthermore, on each of the two paths a nonlinear semiconductor component is disposed in such a way that the nonlinear semiconductor components, because of their polarity and the arrangement of the phase delay line, which has a nominal phase delay of 180°, are rendered conductive in unison, as a function of the carrier. Thus, the carrier is suppressed at the signal output. If a signal in the form of a modulation voltage is applied to the delay path, one or the other of the nonlinear semiconductor components are rendered conductive, as a function of the modulation voltage, which causes modulation of the carrier at the signal output. Such a modulator can also be used as a mixer. A particular embodiment of a modulator operating according to the above-mentioned principle and its use as a mixer is described in German patent DE-PS 29 44 642. The phase delay line of the modulator described in that patent consists of a conductive element having a length $\lambda/2$ of the center frequency of the carrier.

DISCLOSURE OF INVENTION

The known amplitude modulator has limited carrier suppression because of the different layout of the two transmission paths, one via the electrically short path and one via the phase delay path, and can only be used for lower level forms of modulation.

The objective of the invention is to provide a modulator in which the carrier voltage is more strongly suppressed.

This objective is met with a gatelike arrangement in which two partial modulators are coupled together.

Additional embodiments of the invention can be found in the description section which follows.

The advantages obtained with the invention consist particularly in that the temperature dependence of the carrier suppression of the modulator for the temperature ranges present in radio link systems is negligible, amplitude linearity is improved, and the frequency dependence of the connection is reduced.

BRIEF DESCRIPTION OF DRAWINGS

The detailed description of the invention describes exemplary embodiments of modulators with reference to FIGS. 1 through 4. How the invention may be utilized as a mixer is explained at the end of that description.

BEST MODE FOR CARRYING OUT THE INVENTION

Figure 1:
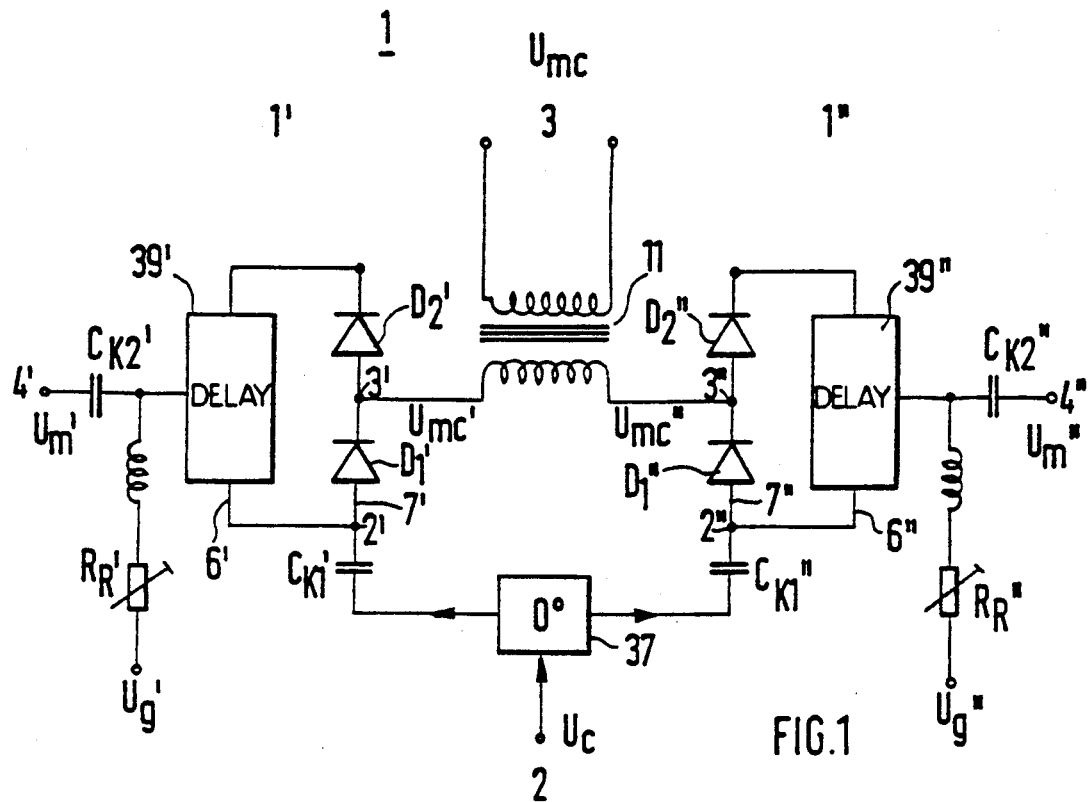
FIG. 1 a schematic representation of the double modulator according to the invention, FIG. 2 a first exemplary embodiment in the form of a double modulator designed in microstrip technology, for high carrier frequencies, FIG. 3 a second exemplary embodiment in the form of a double modulator constructed with discrete components, for low frequencies, and FIG. 4 a schematic representation of a 16 QAM modulator.

For the description of the basic structure of the double modulator 1 shown in FIG. 1, the known partial modulators 1' and 1'' are explained first with their mode of operation, followed by the double modulator 1 according to the invention.

The description of the partial modulators 1',1'' specifically references only the partial modulator 1' but also applies to the partial modulator 1'', since the two partial modulators 1' and 1'' have the same structure and also the same operation.

The partial modulator 1' includes a carrier input 2', a signal input 4', and a signal output 3'. The carrier with the voltage $U_c'$ is present at the carrier input 2'; the modulated carrier with the voltage $U_{mc}'$ is present at the signal output 3', and a digital signal with the modulation voltage $U_m'$ is present at the signal input 4'. Two paths lead from the carrier input 2' to the signal output 3' of the partial modulator 1': an electrically short path 7', and a phase delay path 6' on which is located a phase delay line 39' for shifting the phase of the carrier $U_c$ by 180° or by an odd integer multiple of 180°. From the carrier input 2', the same power having the same phase is applied to each of the two paths. A semiconductor diode $D_1'$, $D_2'$ is disposed on each of the two paths, with the two diodes having opposite polarities relative to the signal output 3'.

The semiconductor diode $D_2'$ on the phase delay path 7' is disposed after the phase delay line 39' relative to the propagation direction of the carrier so that the two semiconductor diodes $D_1'$ and $D_2'$ operate in unison relative to the carrier. In the previously described portion of the partial modulator 1', ideally, because of the disposition of the semiconductor diodes $D_1'$ and $D_2'$ and the layout of the two transmission paths 6',7', carrier voltage suppression prevails at the signal output 3', since the circuit acts as a bridge. In actuality, optimization of the carrier voltage suppression is required. For this, the modulator has a regulable resistor $R_R'$ for balancing in the unmodulated state, which resistor is applied to the potential $U_g'$ and coupled to the signal input 4'.

Figure 2:
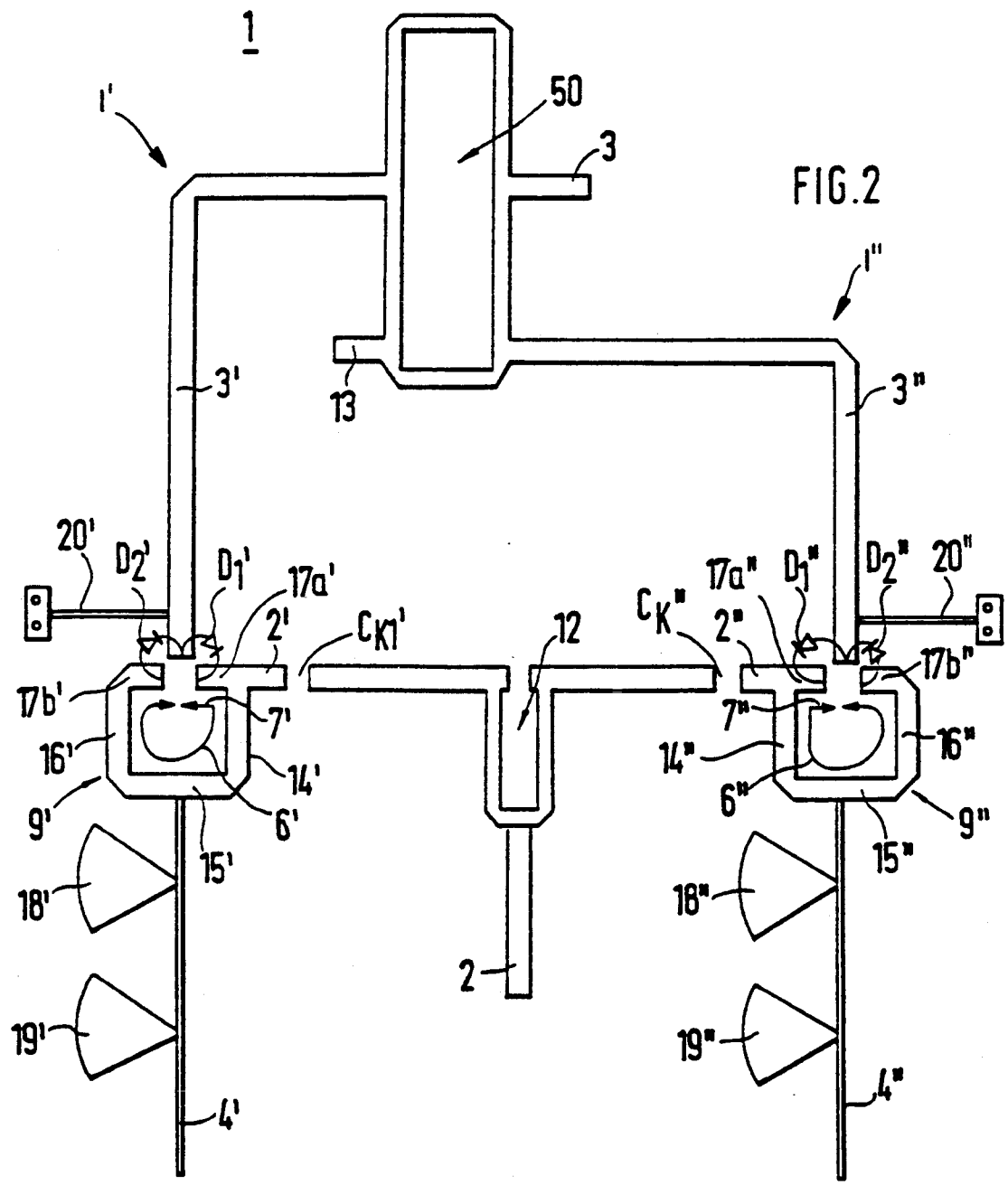

The input signal 4', on which the modulation voltage $U_m'$ is applied, is coupled to the phase delay path 6' so as to alternately render conductive one or the other of the two semiconductor diodes $D_1'$ and $D_2'$. The description of the exemplary embodiments clarifies how this is accomplished. As shown in FIG. 2, the signal input 4' is preferably provided with a low-pass filter 18',19', and the signal output with a high-pass filter 20'.

If a modulation voltage $U_m'$ with sufficiently high amplitude to control the semiconductor diodes $D_1'$ and $D_2'$ is applied to the signal input 4', the first semiconductor diode $D_1'$ is nonconductive and the other semiconductor diode $D_2'$ is conductive, whereby the full carrier voltage $U_c$ is applied to the signal output 3'. If the sign of $U_m$, is changed, the sign of $U_{mc}$, also changes, which is in effect a phase reversal.

To obtain amplitude linearity, relatively small modulation voltages $U_m'$ are applied to the signal input 4', whereby one of the semiconductor diodes, e.g., $D_1'$, conducts less than the other semiconductor diode, e.g., $D_2'$. The balance at the signal output 3' is thereby shifted and a resulting, modulated carrier voltage $U_{mc}'$ is thus generated. The amplitude of the modulated carrier voltage $U_{mc}'$ depends on the magnitude of the modulation voltage $U_m'$ and the phase depends on the sign of the modulation voltage $U_m'$. If a positive modulation voltage $U_m'$, for example, is applied to the signal input 4', the semiconductor diode $D_1'$ is more conductive than the semiconductor diode $D_2'$, whereby the electrically short path 7' has lower impedance than the phase delay path 6', and the transmission over the electrically short path 7' dominates. If the modulation voltage $U_m'$ is negative, the action is exactly the opposite.

Since the partial modulators previously described do not consist of ideal components, a resultant carrier voltage $U_{mc}'$ is present at the signal output 3' even in the absence of any modulation voltage $U_m'$.

The above-described partial modulator 1' thus constitutes a simple transmission mode phase switch, which may function as part of a digital direct modulator.

In the implementation of such a modulator, it is easy to imagine that the bridge balance necessary for carrier suppression and amplitude linearity are both disrupted by, for example, the imbalance of the semiconductor diodes and their parasitic components, which leads to deviation from the ideal behavior of the modulator. Furthermore, the transmission takes place in one case via the electrically short path 7 and in the other case via the phase delay path 6. Since the two paths are also electrically unequal in structure, the group delays are also unequal in the two paths and lead to high frequency dependencies which must be compensated for by means of other measures.

The problem of carrier suppression when no modulation voltage $U_m'$ is applied is solved in accordance with one aspect of the invention by means of the regulatable resistor $R_R'$ and in accordance with another aspect of the invention by means of the symmetric structure of the double modulator 1 depicted in FIG. 1.

In the double modulator 1, the two carrier inputs 2',2" are connected via a 0°-power divider 37 to a common carrier input 2 of the double modulator 1 and galvanically isolated by the capacitors $C_{K1}',C_{K1}"$. The two signal outputs 3',3" are combined in a power combiner, e.g., a transformer 11, whose secondary winding forms the output 3 of the push-pull modulator 1. The two signal inputs 4',4" are supplied with the same modulation signal, whereby a signal invertor (not shown) is disposed before one of the two signal inputs 4' or 4", whose purpose is to guarantee that modulation voltage $U_m'$, $U_m"$ in equal amount and with opposite signs is applied to each of the two signal inputs. Instead of inverting the modulation signals, it is also possible to apply modulation signals with the same sign to the signal inputs 4' and 4" but with the polarity of the diode pairs $D_1',D_2'$ of the partial modulator 1' relative to the carrier input 2 being reversed with respect to the diode pairs $D_1",D_2"$ of the partial modulator 1".

The carrier input 2 of the double modulator 1 is coupled, in accordance with the amplitude of the modulation voltage $U_m$, to the signal output 3 via the transformer 11 and, assuming a positive modulation voltage $U_m'$ at the signal input 4' and a negative modulation voltage $U_m"$ at the signal input 4", via the electrically short path 7' of the partial modulator 1' and via the phase delay path 6" of the partial modulator 1". With opposite signs of the modulation voltage $U_m'$, $U_m"$ at the signal inputs 4',4", the connection is made via the phase delay path 6' of the partial modulator 1' and the electrically short path 7" of the partial modulator 1".

In any case, the transmission always takes place via both one of the electrically short paths 7',7" and a respective one of the phase delay paths 6",6'. In this manner, technical inadequacies of the partial modulator 1',1" are compensated for, the group delay times are virtually equal in either case, and the double modulator 1 demonstrates good temperature stability and amplitude linearity within the carrier frequencies typically provided for radio link systems, and is frequency-independent.

A first exemplary embodiment of a double modulator 1 is illustrated in FIG. 2. It has the same functional units as shown in FIG. 1 but is physically designed for a carrier $U_c$ with a frequency in the gigahertz range and for a modulation voltage $U_m$ with a frequency in the megahertz range, using planar microstrip technology. The arrangement of the functional units corresponds to that in FIG. 1. In the following only the functional units specific to exemplary embodiment 1 are explained in detail. The same functional units are provided with the same reference symbols as in FIG. 1.

The double push-pull modulator 1 has two partial modulators 1',1" with a common carrier input 2 and a common signal output 3. The carrier voltage $U_c$ is applied to the carrier input 2',2" of the two partial modulators 1',1" via a so-called "Wilkinson coupler" 12. The two carrier inputs 2',2" are respectively galvanically isolated via a capacitor $C_{K1}'$, $C_{K1}"$ of the Wilkinson coupler 12. The signal outputs 3',3" are combined via a 180° power combiner 50 in the form of a so-called "rat race ring".

The rat race ring 50 has as input the two signal outputs 3',3" of the partial modulator 1',1", as output the output 3 of the double push-pull modulator 1 and a 50-ohm connection 13 against ground; it effects repeated 180° shifting of the phases of the modulated carrier voltage $U_{mc}'$ emerging from the partial modulator 1' relative to the carrier voltage $U_{mc}"$ emerging from the partial modulator 1" and thus combines these in proper phase relation.

In FIG. 2 each of the two partial modulators 1',1" has four strips 14',14", 15',15", 16',16", 17'(17a',17b'),17"(-17a", 17b") enclosing the surface of a rectangle, wherein the three outer corners between the strips 14',15'; 15',16'; and 16',17b' corresponding to 14",15"; 15",16"; and 16",17b" are trimmed at a 45° angle. The strip 17',17" is interrupted in the center and has two strip sections 17a',17a" and 17b',17b". The carrier input 2',2" is disposed at the ends between the strips 14',17a'; 14",17a". Between the strip section 17a',17a" and the signal output 3',3", a semiconductor diode $D_1',D_1"$ is disposed in the pn-direction viewed from the strip section 17a',17a" and between the strip section 17b',17b" and the signal output 3',3". a semiconductor diode $D_2',D_2''$ is disposed in the np-direction viewed from the strip section 17b',17b".

The strip section 17a',17a" and the semiconductor diode $D_1'$, $D_1''$ form the electrically short path 7',7"; and the strip sections 14',15',16', the strip section 17b', and the semiconductor diode $D_2'$ (and analogously 14", 15", 16", 17b" and $D_2''$ form) the phase delay path 6',6"; whereby the strips 14, 15, 16, and the strip section 17b minus the length of the strip section 17a have a length of one-half the wavelength of the center frequency of the carrier and thus represent the phase delay line 9',9". Here, it is not essential that the strips 14',14" through 17',17" enclose the surface of a rectangle, but that the difference of the path lengths between the phase delay path 6',6" and the electrically short path 7',7" corresponds to one-half the length of the center wavelength of the carrier or to odd integer multiples of this half wavelength. The difference in length between the two paths causes the desired phase delay of 180°. The signal input 4',4" is disposed in the center of strip 15 relative to its length. It is advantageous to position the signal input 4',4" symmetric to the signal output 3',3". It is also possible to have two or more signal inputs instead of one signal input. The signal inputs 4',4" are provided with filter elements 18',18", 19',19" which prevent escape of the carrier to the modulation voltage source. The signal outputs 3',3" are coupled to ground via the lines 20',20" for the modulation signal $U_m'$, $U_m''$. The regulatable resistors $R_R$ applied to the signal inputs 4',4" for control of the partial modulators 1',1" are not shown in FIG. 2.

The double modulator 1 according to a first exemplary embodiment may thus be constructed in simple planar microstrip technology upon which the diodes $D_1',D_1'',D_2', D_2''$ are mounted.

A second exemplary embodiment of a double modulator 1 is illustrated in FIG. 3. As was the case for the double modulator 1 of the first exemplary embodiment, the second exemplary embodiment also has the same functional units as those shown in FIG. 1. The same features are therefore provided with the same reference symbols. Physically, the FIG. 3 embodiment is designed for a carrier $U_c$ with a wavelength in the megahertz range and a correspondingly lower frequency of the modulation signal $U_m$.

The double modulator 1 has two partial modulators 1',1" with a common signal output 3. The carrier $U_c$ is generated in the oscillator 21 which is coupled to the ground 22 on one side and on the other side to the carrier inputs 2',2". Between the oscillator 21 and the carrier inputs 2',2" is an autotransformer 23. Herein, the oscillator 21 is applied to the tap 24 and the two coil ends 25' and 25" are coupled via coupling capacitors $C_{K1}'$ and $C_{K1}''$ to the carrier inputs 2',2". The autotransformer 23 represents a 0° power divider and the resistor $R_{21}$ the internal resistance of the oscillator 21.

The signal outputs 3',3" are coupled to the two coil ends of the primary winding 26 of a transformer 27, which functions as the above-described transformer 11. The coil ends of the secondary winding represent the signal output 3 of the double push-pull modulator 1. For suppression of the modulation voltage $U_m$ at the signal output 3, high-impedance parallel resonant circuits 29',29" are disposed respectively between the coil ends of the primary winding 26 and the signal outputs 3' and 3" for the modulation signal $U_m$.

Each of the two partial modulators 1',1" has a phase delay path 6',6" and an electrically short path 7',7". The phase delay path 6',6" has an autotransformer 30',30" and a semiconductor diode $D_2',D_2''$. The autotransformer 30',30" forms the phase delay line 39', 39" (FIG. 1) in which the phase of the carrier undergoes a 180° inversion. The electrically short path 7',7" has a semiconductor diode $D_1',D_1''$. The polarity of the diodes corresponds to that of the exemplary embodiment 1.

Between the signal output 3', 3" and the tap 33',33", the modulation signal is generated in a generator 34',34", which is applied to the output 3',3" and coupled to the tap 33',33" via a parallel resonant circuit 35',35". The resistors $R_{34}'$, $R_{34}''$ represent the internal resistances of the generators 34',34". The parallel resonant circuit 35',35" has high impedance for the carrier $U_c$.

The two winding sections 31',32'; 31", 32" of the autotransformer 30',30" and the two semiconductor diodes $D_1',D_2'$; $D_1'',D_2''$ act as a Wheatstone bridge, wherein balance prevails between the output 3',3" and the tap 33',33" as long as no modulation voltage $U_m$ is applied. However, if a modulation voltage $U_m$ is applied, the bridge is no longer balanced and the modulated carrier voltage $U_{mc}$ is applied to the output 3',3".

Since the autotransformer 30',30" cannot be produced with ideal characteristics, the phase of the carrier $U_c$ actually does not undergo a 180° inversion, but is given a specific phase error which ultimately prevents total carrier voltage suppression at output 3',3" in the absence of modulation voltage $U_m$. This residual carrier voltage is largely suppressed by means of the likewise symmetric arrangement of the two partial modulators 1',1".

Figure 4:
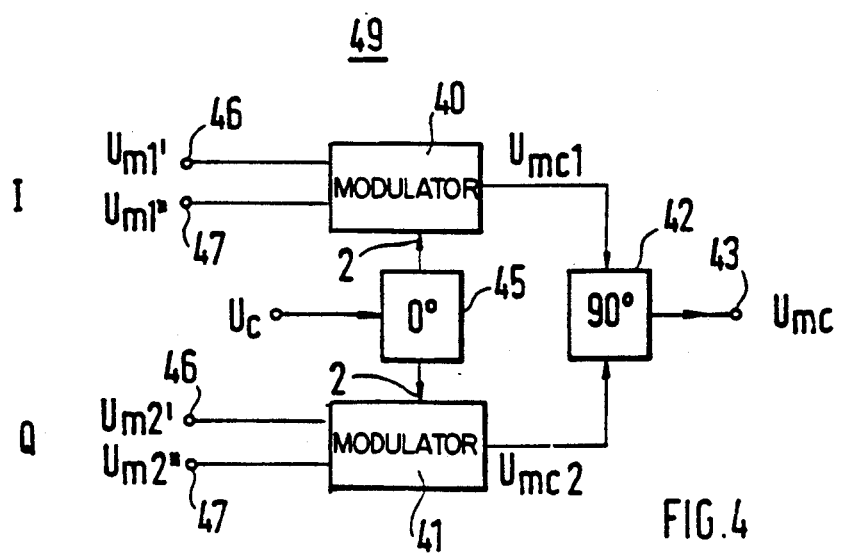

FIG. 4 illustrates in conventional schematic form a 16 QAM (quadrature amplitude modulation) modulator 49 having a bit rate frequency of 140 mbps. It consists essentially of two double modulators 40,41 wherein the first double modulator 40 delivers the signal for the I components and the double modulator 41 delivers the signal for the Q components. The two components are orthogonally combined in the power combiner 42.

The output 43 of the power combiner 42 forms the output of the 16 QAM modulator 49. The carrier $U_c$ is applied to the carrier inputs 2 of the two modulators 40,41 via a so-called "Wilkinson coupler" 45. The modulator signals for the I or Q components are applied respectively to the signal inputs 46,47 of the two double modulators 40,41, whereby in each case a modulation signal $U_m$ of the same amount but with the opposite sign is applied to a double modulator 40,41 for the I or Q components.

Particularly suitable as semiconductor diodes $D_1'$, $D_1''$, $D_2'$, $D_2''$ are Schottky diodes, which, for example, have shorter delay times than pin diodes. The temperature dependence of the diodes is compensated for by means of the pairwise arrangement in the bridge circuit. Fabrication-related differences in the diodes must be balanced, for example, by application of dc voltage via the regulatable resistor on the signal input and the carrier suppression must be thus optimized. The isolating resistor is adjusted so that when the modulation voltage $U_m$ is not applied, bridge balance prevails.

The modulator 1 described can also be operated as a transmitting mixer or a receiving mixer (not shown). The application of the modulator 1 of the first exemplary embodiment is used as an example of a transmitting mixer. The signal inputs 4' and 4" described in the first exemplary embodiment are provided here for coupling of the signal whose frequency is to be converted. When the polarity of the diode pair $D_1',D_2'$ relative to the carrier input 2", as shown in FIG. 2, matches that of the diode pair $D_1'',D_2''$, the signal whose frequency is to be converted must be inverted at one of the two signal inputs. When the polarity of the diode pair $D_1',D_2'$, relative to the carrier input 2", does not match that of the diode pair $D_1'',D_2''$, the two signal inputs can be directly coupled to each other.

The same is also true for the application of the 16 QAM modulator 49 as a mixer which can be operated on the reception side as an image suppression mixer and on the transmission side as a single-sideband mixer. However, for this, with the utilization of the two coupling branches I and Q, it is necessary to couple them to each other via a 90° power combiner.

The application of a modulator as a mixer is known in principle and therefore needs no further explanation.

I claim:

1. A modulator for producing a modulated carrier signal from a carrier signal and a modulation signal, said modulator comprising two partial modulators, each partial modulator further comprising:
an electrically short path and a phase delay path each leading from a carrier input terminal to a signal output terminal, wherein the phase of the carrier in the phase delay path undergoes a phase shift of approximately 180° or an odd integer multiple of 180° compared to the phase of the carrier in the electrically short path, said phase delay path further comprising a phase delay line,
a pair of nonlinear semiconductor components, one located on each of the two paths, said nonlinear semiconductor components having opposing polarity relative to the propagation direction of the carrier and being disposed on the two paths in such a way that, in the absence of any modulation signals, they function in unison relative to the carrier, and
a modulation signal input terminal coupled to the phase delay path in such a way that the semiconductor components operate in push-pull fashion relative to the modulation signal applied to said modulation signal input terminal, and
a rat race ring for scalar addition of the 180° phase-shifted modulated carrier voltages of the partial modulators,
wherein the two carrier input terminals and the two signal output terminals of the two partial modulators are coupled respectively to each other.

2. The modulator claimed in claim 1, wherein
the nonlinear semiconductor components are diodes,
the polarity of the diode pair of one partial modulator relative to the carrier input matches the polarity of the diodes of the other partial modulator, and
the same signals with opposite signs are applied to the signal inputs.

3. The modulator claimed in claim 1, wherein
the nonlinear semiconductor components are diodes,
the polarity of the diode pair of one partial modulator relative to the carrier input is opposite the polarity of the diodes of the other partial modulator, and
the same signals with the same signs are applied to the signal inputs.

4. The modulator claimed in claim 1, wherein the phase delay line is a conductor formed by microstrip technology with a length $\lambda/2$ of the center wavelength of the carrier.

5. A modulator for producing a modulated carrier signal from a carrier signal and a modulation signal, said modulator comprising two partial modulators, each partial modulator further comprising:
an electrically short path and a phase delay path each leading from a carrier input terminal to a signal output terminal, wherein the phase of the carrier in the phase delay path undergoes a phase shift of approximately 180° or an odd integer multiple of 180° compared to the phase of the carrier in the electrically short path, said phase delay path further comprising a phase delay line,
a pair of nonlinear semiconductor components, one located on each of the two paths, said nonlinear semiconductor components having opposite polarity relative to the propagation direction of the carrier and being disposed on the two paths in such a way that, in the absence of any modulation signals, they function in unison relative to the carrier, and
a modulation signal input terminal coupled to the phase delay path in such a way that the semiconductor components operate in push-pull fashion relative to the modulation signal applied to said modulation signal input terminal, and
means for scalar addition of the 180° phase-shifted modulated carrier voltages of the partial modulators, wherein
the two carrier input terminals and the two signal output terminals of the two partial modulators are coupled respectively to each other,
each phase delay line further comprises two partial windings of a first autotransformer, and
each modulation signal input is applied between a tap of the first autotransformer and the output terminal of the partial modulator.

6. The modulator claimed in claim 4, wherein the rat race ring functions as a 180° coupler disposed between the output terminals of the partial modulators and an output of the double modulator.

7. The modulator claimed in claim 5, further comprising a second autotransformer disposed between the carrier input of the double modulator and the carrier inputs of the partial modulators to thereby shift the phase of the carrier, with its tap coupled to the carrier input of the double modulator and its coil ends coupled to the carrier input terminals of the partial modulators.

8. A modulator for producing a modulated carrier signal from a carrier signal and a modulation signal, said modulator comprising two partial modulators, each partial modulator further comprising:
an electrically short path and a phase delay path each leading from a carrier input terminal to a signal output terminal, wherein the phase of the carrier in the phase delay path undergoes a phase shift of approximately 180° or an odd integer multiple of 180° compared to the phase of the carrier in the electrically short path, said phase delay path further comprising a phase delay line,
a pair of nonlinear semiconductor components, one located on each of the two paths, said nonlinear semiconductor components having opposite polarity relative to the propagation direction of the carrier and being disposed on the two paths in such a way that, in the absence of any modulation signals, they function in unison relative to the carrier, and a modulation signal input terminal coupled to the phase delay path in such a way that the semiconductor components operate in push-pull fashion relative to the modulation signal applied to said modulation signal input terminal, and means for scalar addition of the 180° phase-shifted modulated carrier voltages of the partial modulators, wherein the two carrier input terminals and the two signal output terminals of the two partial modulators are coupled respectively to each other, and each signal input of the partial modulators is arranged with a regulatable resistor to balance the partial modulator.

9. The modulator claimed in claim 1, wherein the nonlinear semiconductor components are Schottky diodes.

10. The modulator claimed in claim 1, wherein the partial modulators are designed as amplitude linear phase adjusters.

11. The modulator claimed in claim 1, wherein it is used as a mixer.

* * * * *